(12) United States Patent
Butler et al.

(10) Patent No.: US 6,170,703 B1
(45) Date of Patent: Jan. 9, 2001

(54) CHEMICAL DISPENSING SYSTEM AND METHOD

(75) Inventors: Josh Butler, Kuna; Tamer Elsawy, Boise; R. Mark Hall, Meridian; Wyland Atkins, Kuna; Eric Hansen, Boise, all of ID (US)

(73) Assignee: SCP Global Technologies, Inc, Boise, ID (US)

( * ) Notice: Under 35 U.S.C. 154(b), the term of this patent shall be extended for 0 days.

(21) Appl. No.: 09/227,226

(22) Filed: Jan. 8, 1999

Related U.S. Application Data (60) Provisional application No. 60/103,771, filed on Oct. 9, 1998.

(51) Int. Cl.$^7$ .................................................. G01F 11/00
(52) U.S. Cl. .................................. 222/1; 222/61; 222/64; 222/399
(58) Field of Search ................................ 222/1, 61, 64, 222/145.2, 399

(56) References Cited

U.S. PATENT DOCUMENTS

| | | | |
|---|---|---|---|
| 5,145,092 | * | 9/1992 | Shannon .................................. 222/64 |
| 5,568,882 | * | 10/1996 | Takacs .................................. 222/64 |
| 5,975,357 | * | 11/1999 | Topar .................................. 222/64 |

FOREIGN PATENT DOCUMENTS

| | | | |
|---|---|---|---|
| 0322729 | * | 7/1989 | (EP) ..................................... 222/64 |
| 0460522 | * | 7/1989 | (EP) ..................................... 222/64 |

* cited by examiner

Primary Examiner—Joseph A. Kaufman
(74) Attorney, Agent, or Firm—Limbach & Limbach llp (57) ABSTRACT

Described herein is a chemical injection system and method utilizing a chemical storage vessel coupled to a bulk source of chemical and proportioned to contain a volume of chemical useful for multiple applications for which the chemical is to be utilized. A dispense vessel proportioned to contain a volume of chemical useful for a single application is fluidly coupled to the chemical storage vessel. A controller controls operation of a system of valves and sensors, which operate to fill the chemical storage vessel, and to precisely dispense the volume required for a single application from the storage vessel into the dispense vessel and then ultimately into the vessel in which the chemical is needed.

20 Claims, 6 Drawing Sheets

CHEMICAL DISPENSING SYSTEM AND METHOD

This application claims the benefit of U.S. Provisional Application No. 60/103,771, filed Oct. 9, 1998 now abandoned.

FIELD OF THE INVENTION

The present invention relates generally to the field of systems and methods for dispensing chemicals for industrial applications. More particularly, the present invention relates to a system and method for automatically dispensing needed volumes of chemicals to a high level of accuracy.

BACKGROUND OF THE INVENTION

Accurate dispensing of needed volumes of chemicals is critical to manufacturing processes in a variety of industries. For example, in semiconductor fabrication processes, wafers are immersed in treatment tanks containing process chemicals. Some of the processing steps required for semiconductor processing are highly concentration dependent, because variations in chemical concentrations can result in variations in surface properties between different batches of wafers. It is thus essential to precisely regulate the concentration of the chemicals dispensed into the treatment tanks so as to insure that the finished wafers have the desired surface properties and to further insure consistent processing between wafer batches.

This need is oftentimes at odds with typical operation of the bulk chemical supplies utilized within fabrication facilities to supply chemical for wafer processing. For example, the bulk supplies have flow pressures that vary greatly over time. Time-based dispensing, in which a desired volume is dispensed from the bulk supply simply by regulating the time for which the chemical is allowed to flow into the process tank, is inherently inaccurate in this situation. Without a substantially constant flow rate, the dispense "on" time for the needed volume cannot be accurately calculated. This leads to inconsistent dispensing between successive batches of wafers. As another example, bulk supplies can often shut down for periods of time, leaving no chemical available for dispensing into the treatment tanks. Each of these difficulties can adversely affect the profitability of the fabrication facilities by yielding products having inferior or inconsistent surface characteristics or by forcing temporary shutdown of processing steps. It is therefore desirable to provide a dispensing system and method that will accurately and consistently dispense chemicals regardless of the condition of the bulk source supplying the chemicals.

One solution to the problem of bulk flow rate variations is to precisely measure a volume of chemical being dispensed from the bulk supply using a fluid level sensor positioned in the process tank. The fluid sensor provides feedback that triggers termination of chemical flow into the vessel once the desired volume has been dispensed.

While this solution increases accuracy in dispensing, it fails to address the problem of bulk supply shut down and is impractical for use with process tanks for which the required chemical volume may vary. Multiple fluid level sensors would be required to give the system sufficient versatility to provide varying amounts of chemical, and even then its use would be limited to a finite number of available quantities. Moreover, the need for accurate dispensing requires a slow fluid flow rate into the process vessel, so as to allow sufficient time for flow to be stopped before the dispensed volume significantly exceeds the level detected by the fluid sensor. This mandates a lengthy fill time prior to each use of the treatment tank and thus detracts from the number of wafer batches that can be treated per day.

It is thus desirable to provide a system and method for accurately dispensing chemicals from a bulk supply while minimizing reliance on the flow pressures of the bulk supply. It is further desirable to provide a system that, in addition to having these attributes, is easily adaptable to demands for varying concentrations, which permits quick dispensing of chemicals into process vessels so as to avoid delays between process steps, and which allows processing to continue through bulk supply down times.

SUMMARY OF THE INVENTION

Described herein is a chemical injection system and method utilizing a chemical storage vessel coupled to a bulk source of chemical and proportioned to contain a volume of chemical useful for multiple runs of the application for which the chemical is to be utilized. A dispense vessel proportioned to contain a volume of chemical useful for a single run is fluidly coupled to the chemical storage vessel. A controller controls operation of a system of valves and sensors, which operate to fill the chemical storage vessel, and to precisely dispense the volume required for a single application from the storage vessel into the dispense vessel and then ultimately into the vessel in which the chemical is needed.

DETAILED DESCRIPTION

The system and method according to the present invention will be described in the context of surface preparation for semiconductor substrates. This is done for purposes of illustration only and is not intended in a limiting sense. The system and method of the present invention are equally suitable for use in other industries in which chemicals must be dispensed with a high level of accuracy.

First and Second Embodiments—Structure

Figure 1:
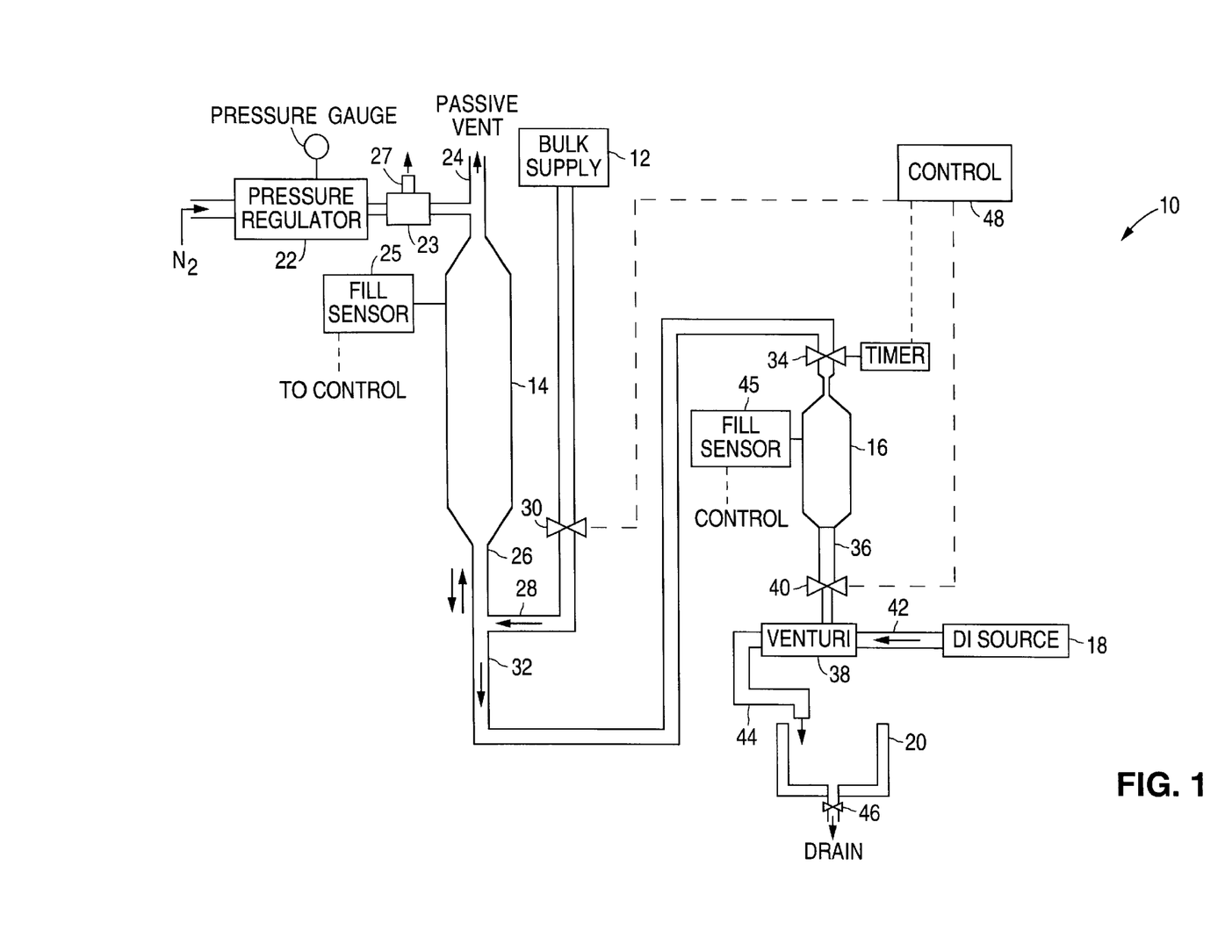
FIG. 1 is a schematic representation of a first embodiment of a chemical dispensing system in accordance with the present invention.

Referring to FIG. 1, a first embodiment of a chemical dispensing system 10 in accordance with the present invention generally includes a bulk chemical supply 12, a primary dispense vessel 14, a secondary dispense vessel 16 and a source 18 of deionized water (DI). The system 10 is used to dispense chemical from bulk supply 12 into a stream of DI water as it flows into a process tank 20. The resultant chemical solution is then used to treat the surfaces of semiconductor wafers immersed in tank 20.

Primary vessel 14 is preferably a cylindrical vessel having a volume that will hold a quantity of chemical sufficient to treat multiple wafer batches in the process tank 20. A pressure regulator 22 and a passive vent 24 are fluidly coupled to primary vessel 14. A three-way valve 23 is positioned between pressure regulator 22 and vent 24. Three-way valve 23 also includes a vent 27.

Pressure regulator 22 uses $N_2$ gas to maintain the pressure within the primary vessel at a desired level, for example 7-psi. Flow of $N_2$ through pressure regulator will continue throughout typical operation of the system. Three-way valve 23 has a first position in which $N_2$ gas flow from the regulator is directed into primary vessel 14, and a second position in which the $N_2$ flow is vented from the system via vent 27.

Passive vent 24 serves as an outlet for fumes released from chemical within tank 14, thus preventing the fumes from corroding the metallic components of pressure regulator 22. Vents 24 and 27 may be isolated from the external environment to prevent air and particles from entering the system. This may be carried out, for example, by coupling the vents to an $N_2$ exhaust or by enclosing them within a closed $N_2$ environment.

A fill sensor 25 is positioned within primary vessel 14. During use, sensor 25 detects when the liquid level within the tank has risen to a predetermined level corresponding to the volume of chemical that will be needed to treat a predetermined number of wafer batches in tank 20.

At the lower end of the primary vessel is a fluid path 26 that serves as both the inlet and outlet path for the vessel. Fluid path 26 is fluidly coupled to an inlet line 28 that carries chemical from bulk supply 12 into the vessel 14. A valve 30 is used to start and stop the flow of chemical into the vessel 14.

Fluid path 26 is further coupled to an outline line 32 that extends between primary vessel 14 and secondary vessel 16. Valve 34 controls the flow into secondary dispense vessel 16.

Figure 2:
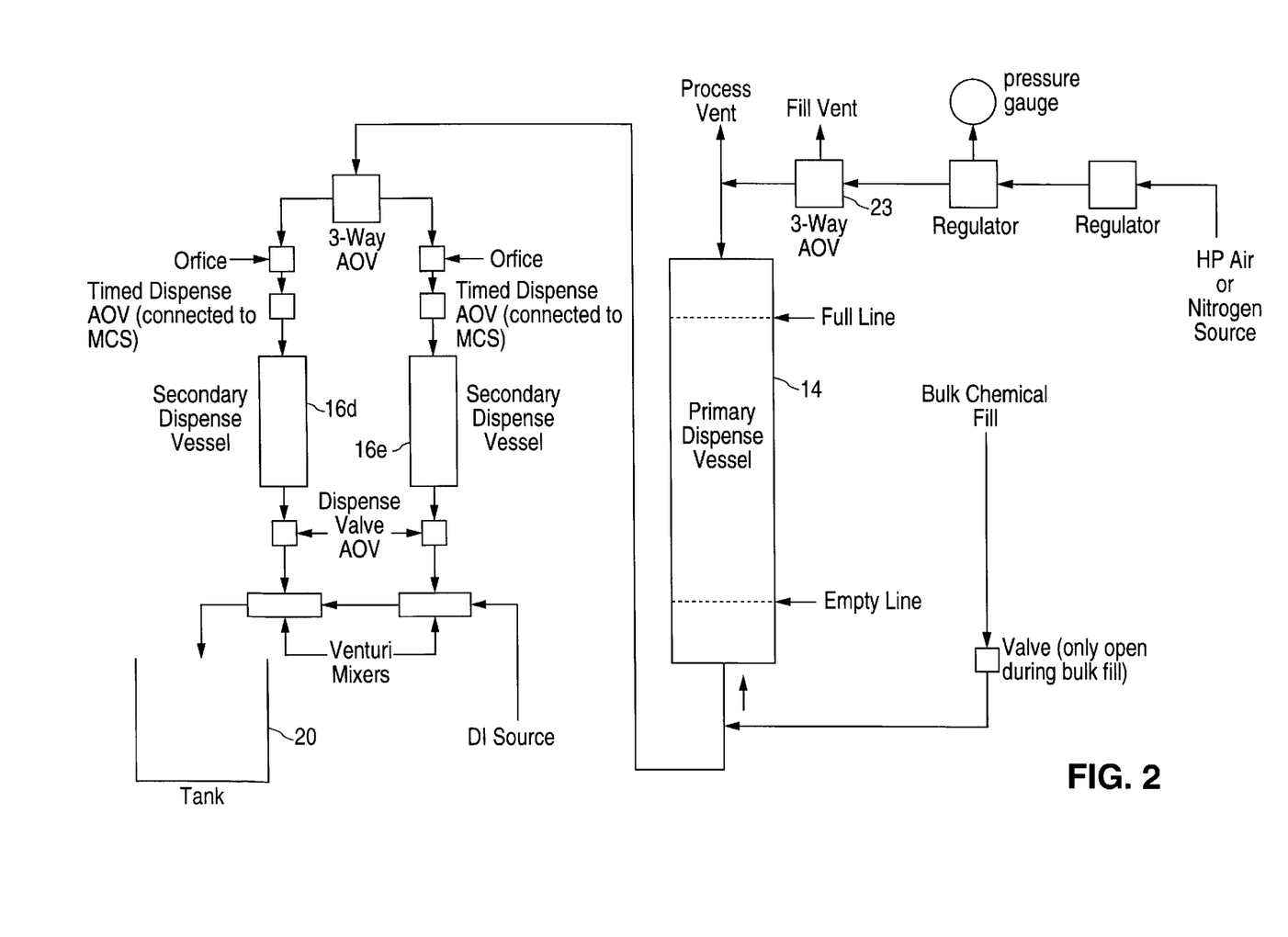
FIG. 2 is a schematic representation of a second embodiment of a chemical dispensing system that is similar to the system of FIG. 1 but that includes two secondary dispense vessels for increased versatility of the system.

Secondary dispense vessel 16 is preferably a cylindrical vessel sized to contain a volume of chemical sufficient to treat a single batch of wafers within the process tank 20. It should be noted with reference to the second embodiment shown in FIG. 2 that the system may be provided with more than one secondary dispense vessel, such as the pair of vessels 16d, 16e. The vessels may be arranged such that both can dispense into a single tank and/or such that each dispenses into a separate tank.

An outlet line 36 extends from the lower end of the secondary vessel and is fluidly coupled to a venturi 38. A third valve 40 is positioned between the secondary vessel and the venturi.

A conduit 42 extends from DI source 18 to the venturi 38. Exit flow from the venturi 38 is directed into the process vessel 20 by conduit 44. Process vessel 20 includes a drain 46 that allows the vessel 20 to be emptied of process fluids between wafer batches.

A fill sensor 45 detects when the liquid level in secondary vessel 16 increases above and falls below a predetermined level. This information is used during the process to confirm when a secondary fill has been carried out and to further confirm when chemical in the secondary vessel has been dispensed.

Each of the sensors and valves for all of the embodiments described herein are preferably electronically coupled to a system controller 48. Controller 48 is programmed to govern control and timing of these components to automatically open and close the valves and regulate flow of fluids etc. to dispense the required volume and concentration of chemical/solution required by the process recipe appropriate for the treatment process to be carried out. A controller suitable for this purpose is a MCS microprocessor controller available from Preco Electronics, Inc. Boise, Id. However, any suitable process control computer can be used.

Controller 48 receives feedback from fill sensor 25, controls the opening and closing of the valves, and may perform additional functions aside from those directly related to the system 10, such as controlling operation of wafer transport systems that move wafers into and out of tank 20, closing the lid of the tank, etc. The functions of the controller 48 that relate most directly to the system 10 will be discussed in greater detail in the Operations section below.

First and Second Embodiments—Operation

There are three general steps involved during operation of the system 10. The first is the bulk fill step, in which primary dispense vessel 14 is filled with chemical from the bulk supply 12. The second is the secondary fill step, in which the amount of chemical needed for a single process step is passed from primary dispense vessel 14 into secondary dispense vessel 16. Finally, a dispensing step is carried out in which the chemical is delivered from the secondary dispense vessel into a DI stream flowing into the process tank.

The bulk fill step is typically carried out when the primary dispense vessel 14 falls below a minimum level. In preparation for the bulk fill step, three-way valve 23 is used to halt $N_2$ flow into the vessel 14 and to divert the $N_2$ flow through a vent Valve 30 is then opened, causing chemical to flow from bulk supply 12 into primary dispense vessel 14.

Fill sensor 25 is configured to provide feedback to the controller indicating that the fluid level in the primary vessel has reached a predetermined level. This level will preferably be selected to correspond to the volume of chemical needed to treat a predetermined number of wafer batches in tank 20. For example, if the process to be carried out in tank 20 requires 200 ml of chemical, primary dispense vessel 14 may be initially filled with 2 L of chemical, corresponding to ten runs of the process.

Once fill sensor 25 detects that primary dispense vessel 14 has been filled to the desired volume, valve 30 is closed and three-way valve 23 is made to divert $N_2$ flow into primary vessel 14. Pressure regulator 22 then uses the $N_2$ flow to maintain the pressure within the vessel 14 at a predetermined level, e.g. 7 psi.

Valve 34 is opened to begin the secondary fill step. Driving force for the secondary fill step is pressure. The pressure source used for this purpose can be a pressurized gas source, an interfaced pressurized fluid source, a weighted piston, or another solid body resting on the surface of the fluid in vessel 14. A preferred configuration utilized the $N_2$ gas pressure described herein. By maintaining a constant pressure through primary vessel 14, the system allows an accurate fill of secondary vessel 16 to be accomplished by simply monitoring the time for which valve 34 has been opened. For example, the flow rate of the system may be such that it takes four minutes to dispense 200 ml into the secondary vessel 16. A flow restrictor causes fluids to be dispensed slowly into secondary vessel 16 so as to insure a high level of accuracy during the secondary fill step. Once valve 34 has been opened for the required duration, it is closed, thereby halting fluid flow into secondary vessel 16.

If primary vessel 14 is tall, there will be a decrease in head pressure within primary vessel 14 each time a quantity of chemical is dispensed into secondary vessel 16. This decrease in head pressure translates into a slower flow rate from the primary to the secondary vessel. For example, assume again that each secondary fill step is intended to fill the secondary vessel with 200 ml of chemical. If it takes 4 minutes to dispense 200 ml from a full primary vessel, the decreased head pressure will cause it to take longer to dispense a second 200 ml into the secondary vessel.

To insure that each secondary fill step will dispense an identical quantity of chemical, the system of the present invention is calibrated to take into account the decreases in head pressure that occur each time a secondary fill step is carried out. For a given chemical, the system controller 48 is thus programmed such that, for a first secondary fill step, valve 34 must be opened for time T1 in order to dispense 200 ml. For a second secondary fill step valve 34 must be opened for time T2 in order to dispense 200 ml, etc. Each time primary dispense vessel is refilled in a bulk fill step, the secondary fill steps begin again using a fill time of T1.

When it is time to dispense chemical into the process vessel, valve 40 is opened to permit chemical to flow from secondary vessel 16 into the venturi 38. Deionized water is simultaneously pumped through the venturi 38 from DI source 18. The DI and chemical mix together and flow into the process tank 20. It is important to note that the flow rates of the DI and chemical are designed to promote even mixing of the chemical and DI, so that the solution flowing into the process tank is at the required concentration. This is important because the wafers may be present in tank 20 as the process fluids are dispensed, and it is necessary to insure that only a fully mixed solution at the required concentration comes into contact with the wafers.

After it has been emptied into tank 20, secondary vessel 16 is refilled from primary vessel 14. This readies the system for dispensing a fresh supply of fluid into tank 20 as soon as a fresh supply is needed. When the primary vessel has been fully emptied, the bulk fill step is repeated so that it will be ready to replenish the chemical in secondary vessel 16 after a secondary dispense is carried out.

Third through Sixth Embodiments

As described above, care must be taken to insure that each of successive secondary fill steps dispenses an identical quantity of chemical regardless of changes in the head pressure in primary dispense vessel 14. The third through sixth embodiments are directed towards alternative means for ensuring the accuracy of the secondary fill process.

Figure 3A:
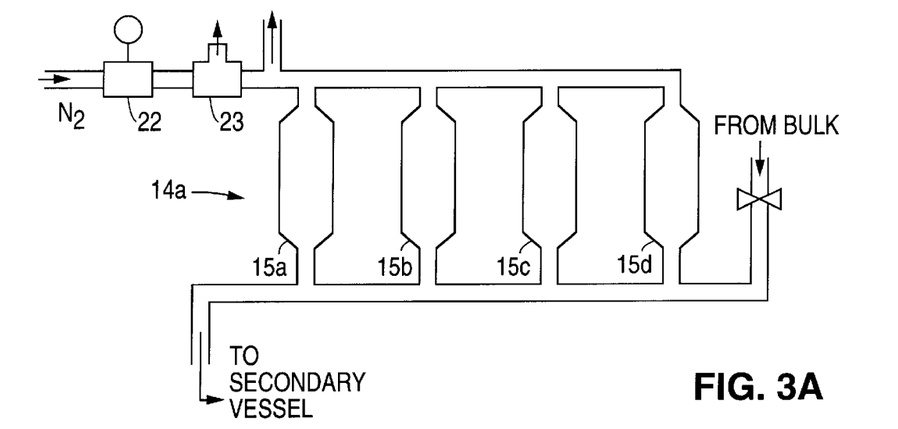
FIG. 3A is a schematic representation of a third embodiment of a primary dispense system for use with the chemical dispensing system of FIG. 1.
Figure 3B:
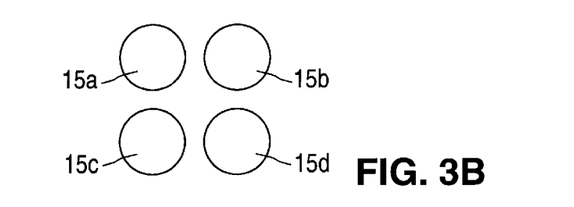
FIG. 3B is a top plan view illustrating an arrangement that may be used for the primary vessels of FIG. 3A.

FIG. 3A illustrates a primary vessel system 14a that may be used as an alternative for primary dispense vessel 14. Primary vessel system 14a is comprised of multiple vessels 15a–15d that are shorter than the vessel 14 but that are connected to one another by plumbing to effectively form a single vessel. Primary vessel system 14a is designed to increase the surface area of the chemical within it over the surface area that would be possessed by an equivalent volume within vessel 14 of FIG. 1. By increasing the surface area, changes in head pressure between successive secondary fill steps are effectively eliminated. Thus, each secondary fill procedure may be carried out for an identical period of time as the other secondary fill procedures and will still dispense an identical volume of chemical. If desired, the vessels 15a–15d may be arranged as shown in FIG. 3B so as to conserve space. It should also be noted that a similar increase in surface area may alternatively be accomplished with a single yet very wide vessel.

Figures 4, 5:
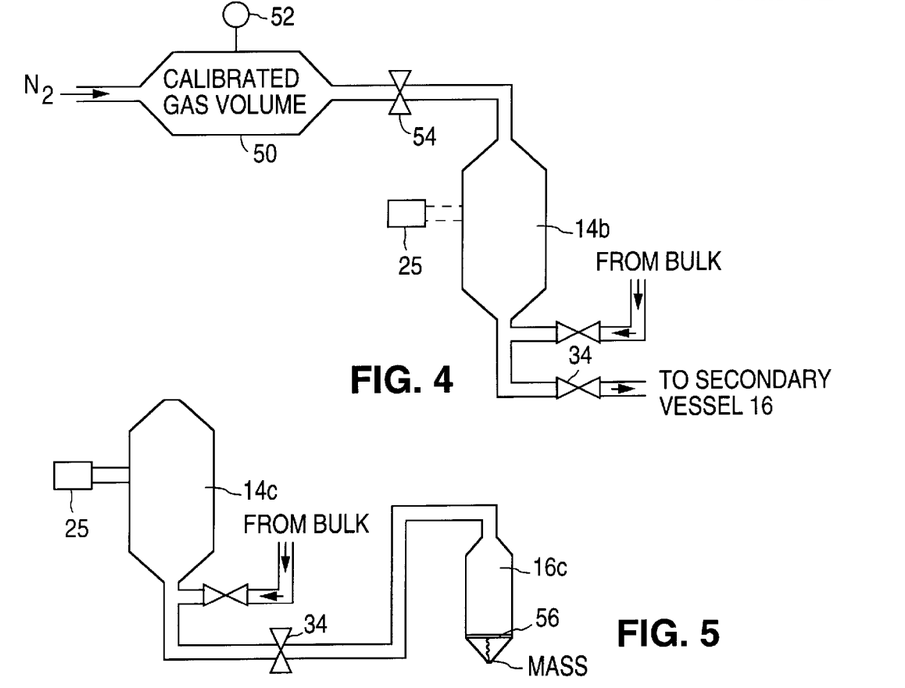
FIG. 4 is a schematic representation of a fourth embodiment of a primary dispense vessel and associated components for use with the chemical dispensing system of FIG. 1.
FIG. 5 is a schematic representation of a fifth embodiment of a primary dispense vessel and associated components for use with the chemical dispensing system of FIG. 1.

FIG. 4 illustrates alternative system components that may be used in combination with the system of FIG. 1 to ensure accuracy in the secondary fill procedure. The FIG. 4 embodiment relies on mass flow control to dispense equal volumes of chemicals each time a secondary fill is carried out and regardless of the fluid height in primary dispense vessel 14b. It includes an $N_2$ source that directs $N_2$ gas into a chamber 50 to create a calibrated gas volume. A pressure gauge 52 monitors the pressure of the chamber 50 and is coupled to the system controller 48. A valve 54 is disposed between the chamber 50 and vessel 14b. The system is calibrated such that the desired amount of chemical will have dispensed into secondary vessel 16 when a predetermined drop in pressure in chamber 50 (e.g. from 20 psi to 5 psi) has occurred.

To carry out a secondary fill, chamber 50 is filled with gas to increase its pressure to a predetermined value (e.g. 20 psi). Valves 54 and 34 (FIG. 1) are then opened. When the pressure monitor detects that pressure has fallen by the predetermined amount, valve 34 is closed. Between each secondary fill procedure, the chamber 50 is re-filled to raise the chamber pressure back to the predetermined starting pressure. Each secondary fill procedure is carried out using the same pressure drop regardless of the fluid height in primary vessel 14b.

Referring to FIG. 5, a fifth embodiment includes another means for accurately filling the secondary vessel, which involves measuring the mass of chemical dispensed into secondary vessel 16c using a scale 56. Since the density of the chemical is known, the system may be configured to close valve 34 once the mass of chemical in vessel 16c has reached a predetermined level corresponding to the desired volume of chemical. As with the embodiment of FIGS. 3A and 4, dispensing according to the embodiment of FIG. 5 may be carried out without regard to the fluid height in primary vessel 14c.

Finally, a sixth embodiment, which includes alternative means for accurately filling the secondary vessel, may be described again with reference to FIG. 1. A liquid level sensor (like fill sensor 45) may be provided within the secondary vessel to detect when the secondary vessel has been filled to a predetermined volume. Rather than using the time-based secondary dispense of the first embodiment, this embodiment utilizes the liquid level sensor to detect when the desired volume has been dispensed into the secondary vessel. Multiple fill sensors may be included, each at a different level in the tank, to provide the user with the flexibility to select a volume to be dispensed from a number of available volumes.

Seventh and Eighth Embodiments

Figures 6A, 6B:
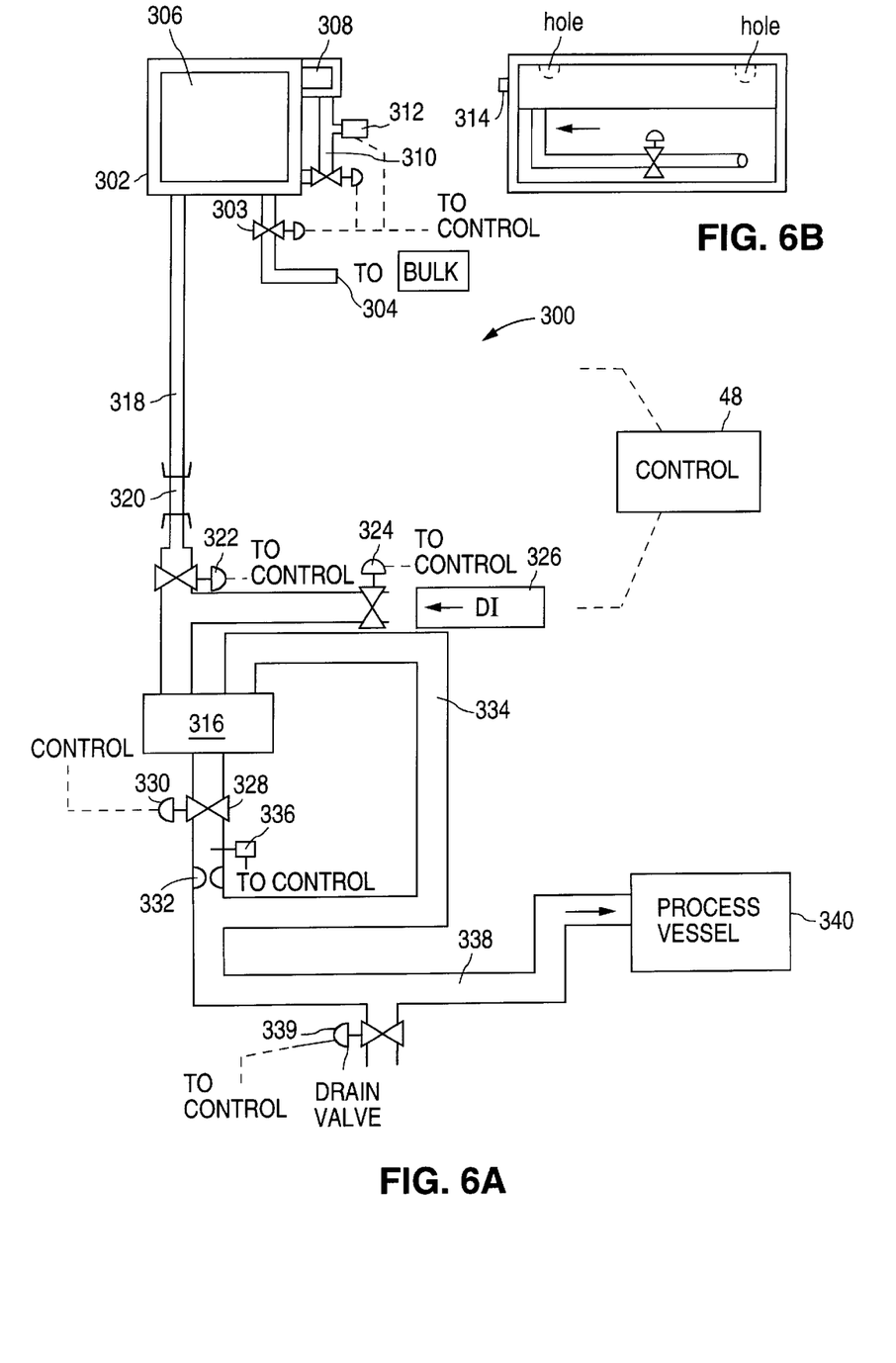
FIG. 6A is a schematic representation of a seventh embodiment of a chemical injection system utilizing principles according to the present invention.
FIG. 6B is a side elevation view of the chemical storage vessel of the chemical injection system of FIG. 6A.

A seventh embodiment of a chemical injection system 300 is shown in FIGS. 6A and 6B. As with the others, chemical injection system 300 is a desirable one in that it permits precise measurement of process chemicals despite the variations in pressure that are inherent to the bulk chemical supplies typically used at foundries. Moreover, the seventh embodiment is further advantageous in that its geometry is such that there is enough head pressure from the height of the system such that an additional outside pressure source need not be used to drive the secondary fill step. Additionally, the seventh embodiment includes a mechanism by which dispensed chemical is mixed with a volume of deionized water during the final dispensing step.

As with all of the other embodiments, timing and control of the various valves utilized by the chemical injection system 300 are governed by process controller 48. The electronic coupling between these components and the controller is not represented in the drawings only for reasons of clarity.

Referring to FIG. 6A, chemical injection system 300 includes a chemical storage vessel 302 coupled to a bulk chemical supply 304. Chemical storage vessel includes a main chamber 306 and a side chamber 308 extending from the main chamber. The interiors of the main and side chambers are contiguous with one another. In addition, a fluid line 310 extends between the main and side chambers and a valve 311 is positioned in fluid line 310. A liquid level sensor 312 is positioned to monitor the liquid level in fluid line 310 and to provide feedback concerning the liquid level to system controller 48. A vent 314 extends from a wall of the primary vessel.

A dispense vessel 316 is coupled to chemical storage vessel 302 by line 318, which includes reduced flow orifice 320. A valve 322 is positioned downstream of orifice 320, and a DI line joins line 318 further downstream of valve 322. A valve 324 governs flow of DI water from DI source 326 into vessel 316.

An outlet line 328 extends from dispense vessel 316 and includes a valve 330 and a reduced flow orifice 332. Liquid level sensor 336 is positioned in line 328 to detect when fluid is present in line 328 (i.e. once valve 330 has been opened) and thus to detect whether vessel 316 has been filled/emptied. The sensor 336 may be positioned in alternative locations which would likewise provide such feedback. For example, it may be positioned in a side tube extending from vessel 316 (similar to side tube 310 of vessel 302) or it may be positioned in vessel 316 itself. It should be appreciated with this and the other sensors described herein that the sensors are not limited to any particular location so long as they are positioned to detect the condition for which they are used in the described process. In this case, sensor 336 is associated with vessel 316 and its components to indicate whether vessel 316 has been filled/emptied.

A side branch 334 connects outlet line 328 with an upper section of vessel 316. Further downstream of side branch 334 is a dispensing line 338 fluidly coupled with the vessel 340 into which the chemical is to be dispensed.

There are four general steps involved during operation of chemical injection system 300. The first is the bulk fill step, in which chemical storage vessel 302 is filled with chemical from bulk supply 304. The second is timed secondary fill step, in which the amount of chemical needed to treat a batch of wafers is passed from chemical storage vessel 302 into dispense vessel 316. The secondary fill step is accomplished by opening valve 322 for a period of time predetermined to cause the desired volume to be dispensed into vessel 316. Third, valve 330 is opened to allow the chemical from vessel 316 into line 338. As will be discussed in detail, this step is timed and utilizes sensor 336 to verify the accuracy of the secondary fill step. Finally, a dispensing step is carried out in which the chemical is carried from line 338 into the process tank by a DI stream passing into and through vessel 316.

The bulk fill step is typically carried out when the volume of the chemical storage vessel 302 has decreased to a predetermined minimum level. Valve 303 which lies between vessel 302 and bulk supply is opened, causing chemical to flow from the bulk supply into vessel 302. All other valves in the system remain closed throughout the bulk fill step.

Fill sensor 312 is configured to provide feedback to controller 48 indicating that the fluid level in chemical storage vessel 302 has reached a predetermined level. The level will preferably be selected to correspond to the volume of chemical needed to treat a predetermined number of wafer batches in vessel 340.

Once fill sensor 312 detects that chemical storage vessel 302 has been filled to the desired volume, valve 303 is closed. Next, valve 322 is opened to initiate the secondary fill step into vessel 316. The system allows an accurate fill of vessel 316 by monitoring the time for which valve 322 has been opened. For example, the flow rate of the system may be such that it takes four minutes to dispense 200 ml into the vessel 316. Once valve 322 has been opened for the required duration, it is closed, thereby halting fluid flow into vessel 316. Reduced flow orifice 320 causes fluids dispensed into dispense vessel 316 to flow slowly, so as to insure a high level of accuracy during the secondary fill step by minimizing the effect of the split second delay between issuance of the "close" control signal to valve 322 and the actual closing of the valve. It should be noted that the system is useful for applications in which successive runs of the system require different dispense volumes. Simply changing the amount of time for which valve 322 will be opened during the secondary fill step can change the volume of chemical dispensed.

After valve 322 has been closed, valve 330 is opened to permit chemical to flow from dispense vessel 316 into dispense plumbing 338, which is preferably large enough to contain the entire dispense volume. Once line 328 has been emptied, sensor 336 turns off, indicating that vessel 316 has been completely evacuated. The system registers the time lapsed between the opening of valve 330 and the turning off of sensor 336, which is the amount of time taken to empty vessel 316. The measured time is compared by the system to a value saved in the system's software correlating to the amount of time that it should take for the desired dispense volume to exit vessel 316 given the known rate at which fluid will flow from vessel 316. This step is done in order to verify the initial time dispense into vessel 316. If the comparison reveals a possible error in the amount of chemical dispensed, remedial measures are taken before wafers are transferred into vessel 340. Such remedial measures may include disposing of the chemical via drain valve 339 and repeating the secondary fill step.

It should be noted that if sensor 336 is positioned in vessel 316 or in a side tube extending from vessel 316 rather than in the position shown, it may also used for a volumetric verification (i.e. to verify that vessel 316 has been filled above or drained below the location of the sensor) as well as for the time verification just described.

Shortly afterwards, when it is time to dispense chemical into the vessel 112, valve 324 is opened, causing DI water to flow from source 326, into dispense vessel 316, and then into plumbing 338 via lines 328 and 334. Because of the positioning of reduced flow orifice 332 in line 328, only a small portion of the DI water flows through line 328 where it serves to rinse chemical from the line. A larger percentage of the DI fills the vessel 316 and flows through side branch 334 into line 338, pushing the chemical in line 338 into vessel 340 while also rinsing vessel 316 and lines 334 and 338. Controller 48 causes valve 324 to close after the appropriate amount of DI water has been dispensed. Control over the volume of DI water dispensed can be carried out by keeping valve 324 opened for a predetermined amount of time know to result in dispensing of the required volume, or by closing valve 324 in response to feedback from a liquid level sensor in the vessel 340.

Figure 7A:
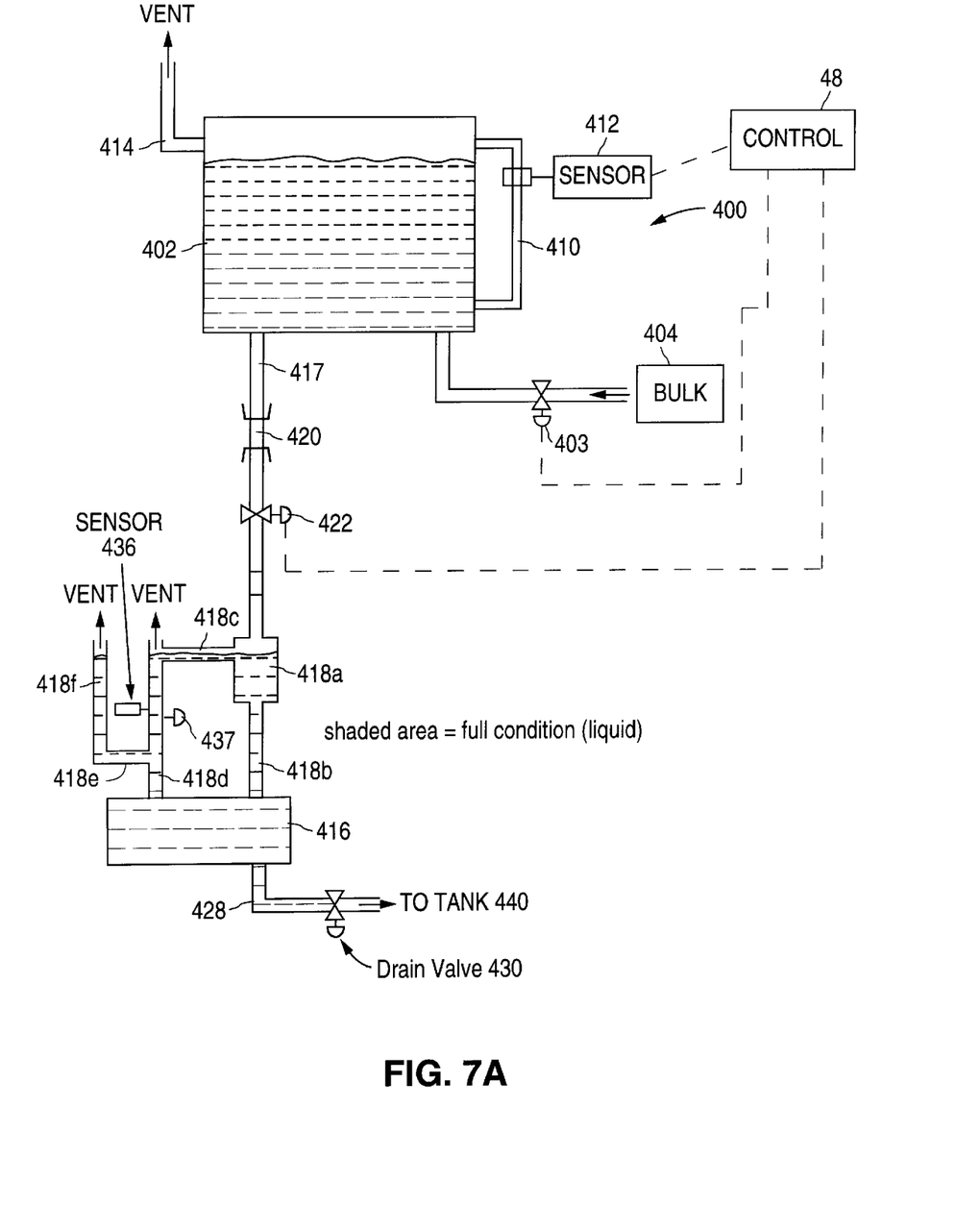
FIG. 7A is a schematic representation of an eighth embodiment of a chemical injection system utilizing principles according to the present invention.

FIG. 7A shows an eighth chemical injection system 400 particularly useful for dispensing chemical for use in processes for which the required dispense volume does not change for successive runs of the system. The eighth embodiment as shown also differs from the prior embodiments in that it dispenses chemical without mixing the chemical with another fluid such as DI water, although it may alternatively be configured to dispense a solution. As with all of the other embodiments, timing and control of the various valves utilized by the chemical injection system 400 are governed by process controller 48. The electronic coupling between these components and the controller is not represented in the drawings only for reasons of clarity.

Chemical injection system 400 includes a chemical storage vessel 402 coupled to a bulk supply of drying compound 404. A fluid line 410 extends between upper and lower portions of vessel 402. A liquid level sensor 412 is positioned to monitor the liquid level in fluid line 410 and to provide feedback concerning the liquid level to system controller 48. A vent 414 extends from a wall of vessel 402.

A dispense vessel 416 is coupled to chemical storage vessel 402 by a system of plumbing formed of line 417, reservoir 418a, and lines 418b through 418f. A reduced flow orifice 420 is positioned in line 417 and a valve 422 is positioned downstream of orifice 420.

The opening in reservoir 418a at its connection with line 418c is significantly smaller than the diameter of the pipe forming line 418c. For example, reservoir 418a may include a ½ inch diameter opening leading to a 1-inch diameter line 418c. Lines 418d and 418f have vents at their upper ends. The vent in line 418f prevents a pressure lock situation from occurring in the system in which bubbles form in the fluid and displace fluid volume. A sensor 436 is located in line 418d and a valve 437 is positioned below sensor 436.

Vessel 416 and its associated plumbing 418a–f are proportioned to contain and precisely dispense the entire quantity of chemical needed for a single dispense operation. They are arranged such that detection of a fluid level by sensor 436 occurs when dispense vessel 416 and its associated plumbing has been filled with slightly more than the required volume of chemical for the process. Dispense vessels and plumbing of different volumes may be used to replace vessel 416 and its plumbing when different dispense volumes are needed.

A dispensing line 428 extends from dispense vessel 416 and includes a valve 430. Dispensing line 428 is fluidly coupled with a vessel 440 into which the chemical is to be dispensed.

There are three general steps involved during operation of chemical injection system 400. The first is the bulk fill step, in which chemical storage vessel 402 is filled with chemical drying compound from bulk supply 404. The second is a secondary fill step, in which the amount of chemical needed for use in drying a batch of wafers is passed from storage vessel 402 into dispense vessel 416 and its plumbing.

Third, valve 430 is opened to allow the chemical from vessel 416 and its plumbing into vessel 440.

The bulk fill step is typically carried out when the volume of the chemical storage vessel 402 has decreased to a predetermined minimum level. Valve 403 is opened, causing chemical to flow from the bulk supply into the vessel. Valve 422 remains closed throughout the bulk fill step.

Fill sensor 412 is configured to provide feedback to controller 48 indicating that the fluid level in chemical storage vessel 402 has reached a predetermined level. The level will preferably be selected to correspond to the volume of chemical needed to carrying out a predetermined number of drying procedures.

Once fill sensor 412 detects that chemical storage vessel 402 has been filled to the desired volume, valve 403 is closed. Next, valve 422 is opened to initiate the secondary fill step into vessel 416. It should be noted that valve 437 in line 418d remains closed during the secondary fill.

During the secondary fill, fluid flows through orifice 420, filling the portion of line 428 that lies upstream of valve 430, then filling vessel 416, line 418b and then reservoir 418a. Next, fluid cascades from reservoir 418a into line 418c and into the portion of line 418d that sits above closed valve 437. Fluid also rises from vessel 416 into the portion of line 418d that lies below valve 437, and flows into lines 418e and 418f. When sensor 436 detects a fluid level, the calibrated fluid volume has been achieved. In response, valve 422 is closed, thereby halting fluid flow into vessel 416. Shading in FIG. 7A represents the calibrated volume of fluid at the end of the secondary fill step.

After valve 422 has been closed, valve 430 is opened to permit chemical to flow from dispense vessel 416 into vessel 440. It should again be noted that at this stage valve 437 remains closed.

After valve 430 has been opened for a predetermined amount of time known to dispense the calibrated volume of chemical, it is closed. Because valve 437 remains closed during the secondary fill, a small volume of fluid remains in line 418c and in the portion of line 418d that is above valve 437. Valve 437 is next opened to allow this small volume of fluid to flow into vessel 416 where it will form a portion of the calibrated volume measured during the following secondary fill step. This small volume corresponds to the amount of volume over the required process volume that will enter the system as a result of the inability of valve 422 to close instantaneously when sensor 436 detects a liquid level.

Figure 7B:
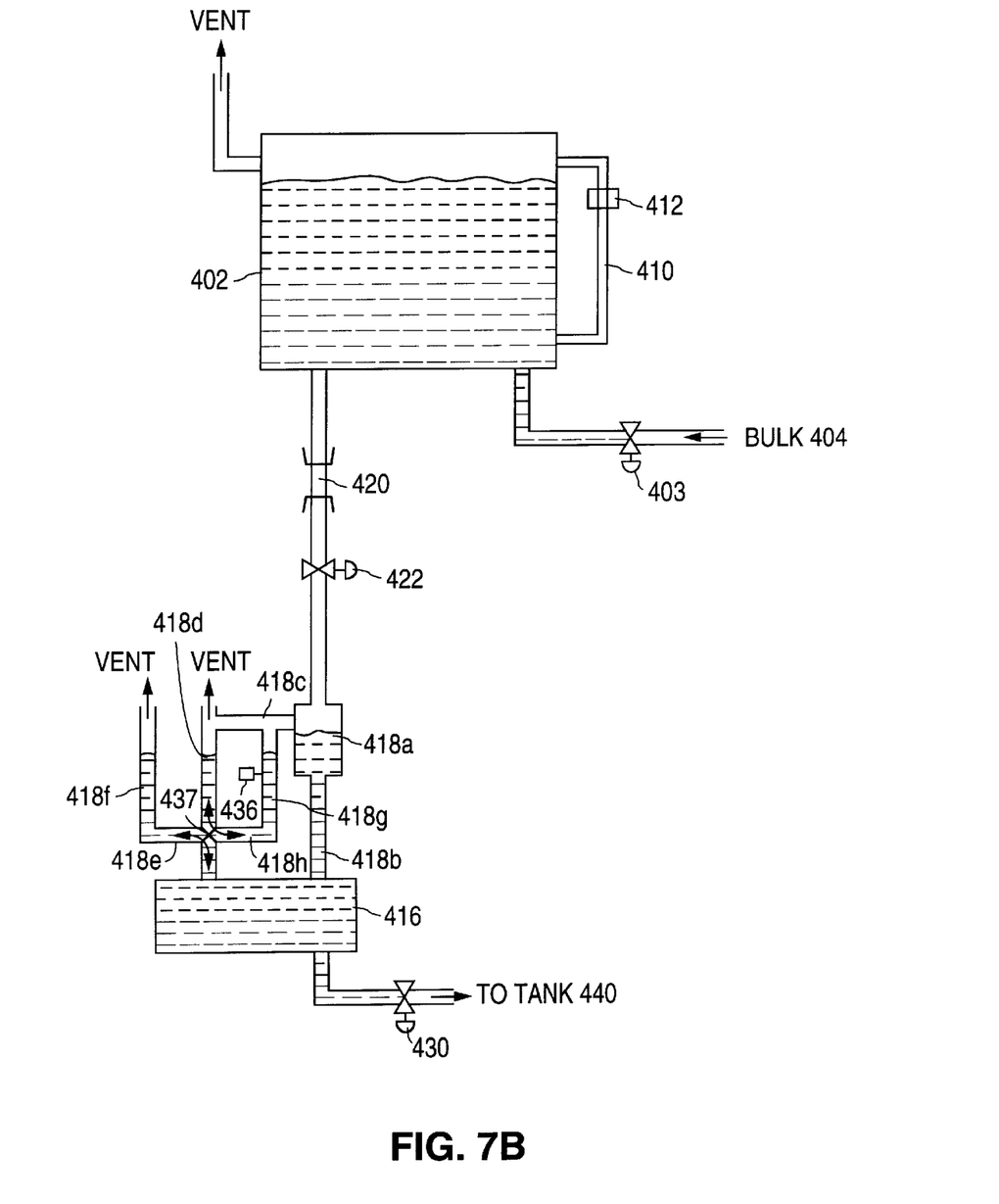
FIG. 7B is a schematic representation of an ninth embodiment similar to the eighth embodiment but able to accommodate larger overflow volumes.

FIG. 7B shows an alternative configuration for the plumbing associated with vessel 416. The alternative configuration has geometry that will catch a larger overflow volume from reservoir 418a and keep that overflow volume separate from the volume ultimately dispensed into vessel 440. As discussed, the overflow volume results because valve 422 cannot close instantaneously when sensor 436 detects that the calibrated volume has been dispensed during the secondary fill. Naturally, the amount of overflow volume is greater when faster flow rates are used through line 417. The geometry of the embodiment of FIG. 7B allows greater flow rates to be utilized for the secondary fill by providing plumbing that will accommodate a larger overflow volume. As a result, the secondary fill step can be carried out more quickly.

Referring to FIG. 7B, plumbing associated with vessel 416 differs from that shown in FIG. 7A in that it includes additional line 418g extending from line 418c, and line 418h extending between lines 418g and 418d. Fluid sensor 436 is positioned to detect a fluid level in line 418g. Valve 437 is positioned such that when opened the lines 418d, 418e and 418h are all fluidly coupled to one another, and that when closed it permits flow only between the upper portion of line 418d and line 418h, and between line 418e and the lower portion of line 418d.

During a secondary fill operation utilizing the system of FIG. 7B, valve 437 is in the closed condition. Fluid flows through orifice 420, filling the portion of line 428 that lies upstream of valve 430, then filling vessel 416, line 418b and then reservoir 418a. Next, fluid cascades from reservoir 418a into line 418c and into line 418g. Since when valve 437 is closed fluid from line 418g can flow into the portion of line 418d above valve 437, fluid rises upwardly through line 418d. Fluid also rises from vessel 416 into the portion of line 418d that lies below valve 437, and flows into lines 418e and 418f. When sensor 436 detects a fluid level, the calibrated fluid volume has been achieved. In response, valve 422 is closed, thereby halting fluid flow into vessel 416. Shading in FIG. 7B represents the calibrated volume of fluid at the end of the secondary fill step.

As with the embodiment of FIG. 7A, valve 430 is opened for a predetermined amount of time known to dispense the calibrated volume of chemical into tank 440, and is then closed. Since valve 437 is kept closed during the secondary fill, the overflow volume of fluid remains in lines 418c, 418d (upper portion), 418g and 418h. After valve 430 is closed, valve 437 is opened to allow this small volume of fluid to flow into vessel 416 where it will form a portion of the calibrated volume measured during the following secondary fill step.

Several examples of embodiments utilizing principles of the present invention have been described herein. It should be appreciated that these embodiments are given for purposes of illustration only and are not intended to limit the scope of the invention. Many modifications may be made to these embodiments without departing from the scope of the invention.

We claim:

1. A chemical injection system for dispensing chemical into a vessel, comprising:
   a chemical storage tank fluidly coupled to a bulk chemical supply, the chemical storage tank proportioned to contain a first volume of chemical;
   a dispense tank fluidly coupled to the chemical storage tank, the dispense tank proportioned to contain a second volume of chemical;
   a first valve between the chemical storage tank and the dispense tank;
   a second valve between the dispense tank and a vessel into which chemical is to be dispensed; and
   control means for opening the first valve to dispense a predetermined quantity of chemical from the storage tank to the dispense tank, the predetermined quantity corresponding to an amount needed to carry out a process in the vessel, and further for opening the second valve to dispense the predetermined quantity from the dispense tank into the vessel and to thereby substantially empty the dispense tank.

2. The apparatus of claim 1 wherein the control means opens the first valve for a predetermined period of time to dispense the predetermined quantity.

3. The apparatus of claim 1 further including a liquid level sensor positioned to detect when a liquid level associated with the dispense vessel has achieved a predetermined level, the control means being responsive to output from the liquid level sensor to close the first valve.

4. The apparatus of claim 1 further including a secondary fluid source fluidly coupled to the dispense tank, and a third valve positioned between the secondary fluid source and the dispense tank, the control means being further for controlling operation of the third valve to permit a secondary fluid to mix with the predetermined quantity of chemical to form a process solution.

5. The apparatus of claim 4 wherein the secondary fluid source is positioned upstream of the dispense tank.

6. The chemical injection system of claim 1, wherein:
   the system further includes a second dispense tank fluidly coupled to the chemical storage tank and a third valve between the second dispense tank and the vessel; and
   the control means is further for controlling dispensing of a second predetermined quantity of chemical from the storage tank to the second dispense tank and further for opening the third valve to dispense the second predetermined quantity from the second dispense tank into the vessel.

7. The chemical injection system of claim 6 further including a secondary fluid source fluidly coupled to the second dispense tank, and a fourth valve positioned between the secondary fluid source and the second dispense tank, the control means being further for controlling operation of the third valve to permit a secondary fluid to mix with the second predetermined quantity of chemical to form a process solution.

8. The chemical injection system of claim 1, wherein the chemical storage tank is formed of a plurality of storage tanks fluidly coupled to one another.

9. The chemical injection system of claim 1 further including a gas chamber fluidly coupled with the chemical storage tank, and a pressure monitor positioned to detect pressure within the chemical storage tank, wherein the control means is further for closing the first valve in response to output from the pressure monitor.

10. The chemical injection system of claim 1 further including a mass detector for measuring the mass of chemical in the dispense tank, wherein the control means is further for closing the first valve in response to output from the mass detector.

11. The chemical injection system of claim 1, wherein:
   the system further includes overflow plumbing fluidly coupled to the dispense vessel, and a fluid sensor positioned in the overflow plumbing; and
   the control means is further for terminating flow of chemical into the dispense tank when the fluid sensor detects fluid at a predetermined level in the overflow plumbing.

12. The chemical injection system of claim 11, wherein:
   the system further includes a third valve in the overflow plumbing; and
   the control means is further for using the third valve to isolate an overflow volume of chemical in the overflow plumbing prior to opening the second valve.

13. The chemical injection system of claim 11 wherein the control means is further for opening the third valve after the chemical in the dispense tank has been dispensed into the vessel and the second valve has been closed, to allow the overflow volume to flow into the dispense vessel.

14. The chemical injection system of claim 1 further including a pressure regulator associated with the chemical storage tank.

15. A method of dispensing a predetermined volume of chemical, comprising the steps of:
   (a) providing a chemical storage tank fluidly coupled to a bulk chemical supply, the chemical storage tank proportioned to contain a first volume of chemical, and further providing a dispense tank fluidly coupled to the chemical storage tank, the dispense tank proportioned to contain a second volume of chemical;
   (b) delivering a first volume of chemical from the bulk chemical supply to the chemical storage tank;
   (c) delivering a second, predetermined, volume of chemical from the chemical storage tank to the dispense tank; and
   (d) delivering the second volume of chemical from the dispense tank to a vessel, thereby substantially emptying the dispense tank.

16. The method of claim 15 wherein step (c) is carried out by flowing chemical from the chemical storage tank into the dispense tank for a predetermined period of time.

17. The method of claim 16 wherein further including the step of verifying the accuracy of the dispensing carried out in step (c) as the chemical is dispensed in step (d).

18. The method of claim 15 wherein step (a) further provides a fluid sensor positioned to detect when a liquid level in the dispense tank has reach a predetermined level, and wherein step (c) is carried out by flowing chemical from the chemical storage tank into the dispense tank until the fluid sensor detects fluid at the predetermined level.

19. A method of dispensing a predetermined volume of chemical, comprising the steps of:
   (a) providing a chemical storage tank fluidly coupled to a bulk chemical supply, the chemical storage tank proportioned to contain a first volume of chemical, and further providing a dispense tank fluidly coupled to the chemical storage tank, the dispense tank proportioned to contain a second volume of chemical, and further providing overflow plumbing fluidly coupled to the dispense tank, and a fluid sensor positioned in the overflow plumbing;
   (b) delivering a first volume of chemical from the bulk chemical supply to the chemical storage tank;
   (c) delivering a second, predetermined, volume of chemical from the chemical storage tank to the dispense tank; and
   (d) delivering the second volume of chemical from the dispense tank to a vessel, and wherein step (c) includes flowing chemical from the chemical storage tank into the dispense tank, causing the dispense tank to fill and further causing an overflow volume to flow into the overflow plumbing, and terminating flow of chemical into the dispense tank when the fluid sensor detects fluid at a predetermined level in the overflow plumbing.

20. The method of claim 19 wherein step (d) includes the step of isolating the overflow volume from the chemical volume in the dispense tank prior to dispensing chemical into the vessel.

* * * * *